(12) United States Patent
Grois et al.

(10) Patent No.: US 12,301,888 B2
(45) Date of Patent: *May 13, 2025

(54) SYSTEMS AND METHODS FOR DEBLOCKING FILTERING

(71) Applicant: Comcast Cable Communications, LLC, Philadelphia, PA (US)

(72) Inventors: Dan Grois, Beer Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,366

(22) Filed: Apr. 8, 2024

(65) Prior Publication Data

US 2024/0259606 A1 Aug. 1, 2024

Related U.S. Application Data

(63) Continuation of application No. 17/652,200, filed on Feb. 23, 2022, now Pat. No. 11,991,398, which is a
(Continued)

(51) Int. Cl.
| | |
|---|---|
| *H04N 19/00* | (2014.01) |
| *H04N 19/117* | (2014.01) |
| *H04N 19/14* | (2014.01) |
| *H04N 19/16* | (2014.01) |
| *H04N 19/176* | (2014.01) |
| *H04N 19/82* | (2014.01) |
| *H04N 19/86* | (2014.01) |

(52) U.S. Cl.
CPC ........... *H04N 19/82* (2014.11); *H04N 19/117* (2014.11); *H04N 19/14* (2014.11); *H04N 19/16* (2014.11); *H04N 19/176* (2014.11); *H04N 19/86* (2014.11)

(58) Field of Classification Search
CPC .... H04N 19/176; H04N 19/117; H04N 19/16; H04N 19/86; H04N 19/14; H04N 19/82
See application file for complete search history.

(56) References Cited

U.S. PATENT DOCUMENTS

| | | |
|---|---|---|
| 11,290,749 B2 | 3/2022 | Grois et al. |
| 2009/0180026 A1* | 7/2009 | Tang ..................... H04N 19/176 348/E7.001 |

(Continued)

OTHER PUBLICATIONS

McCann etal. "High Efficiency Video Coding (HEVC) Test Model 16 (HM 16) Encoder Description". JCTVC-R1002 (Year: 2014).
(Continued)

*Primary Examiner* — Zhihan Zhou
(74) *Attorney, Agent, or Firm* — BakerHostetler

(57) ABSTRACT

Methods and systems for in-loop filtering may comprise receiving a video comprising at least one frame. The frame may comprise at least one block of pixels. A content complexity of the block of pixels may be determined. A viewing characteristic of the video may be determined. A number of borders to be filtered may be determined based on at least one of the content complexity or the viewing characteristic. A deblocking filter strength may be determined based on at least one of the content complexity or the viewing characteristic. The number of borders of the block of pixels may be filtered according to the deblocking filter strength.

22 Claims, 9 Drawing Sheets

Related U.S. Application Data continuation of application No. 16/514,713, filed on Jul. 17, 2019, now Pat. No. 11,290,749.

(60) Provisional application No. 62/699,588, filed on Jul. 17, 2018.

(56) References Cited

U.S. PATENT DOCUMENTS

| | | | | |
|---|---|---|---|---|
| 2013/0294525 A1* | 11/2013 | Norkin | H04N 19/117 | 375/240.24 |
| 2013/0318253 A1* | 11/2013 | Kordasiewicz | H04L 65/765 | 709/231 |
| 2014/0321552 A1* | 10/2014 | He | H04N 19/117 | 375/240.24 |
| 2015/0003522 A1* | 1/2015 | Yin | H04N 19/174 | 375/240.12 |
| 2015/0312595 A1* | 10/2015 | Vanam | H04N 19/136 | 375/240.29 |
| 2017/0085917 A1* | 3/2017 | Hannuksela | H04N 19/136 | |
| 2017/0230656 A1* | 8/2017 | Leontaris | H04N 19/117 | |

OTHER PUBLICATIONS

US Patent Application filed Feb. 23, 2022, entitled "Systems and Methods for Deblocking Filtering", U.S. Appl. No. 17/652,200.
US Patent Application filed Jul. 17, 2019, entitled "Systems and Methods for Deblocking Filtering", U.S. Appl. No. 16/514,713.

* cited by examiner

SYSTEMS AND METHODS FOR DEBLOCKING FILTERING

CROSS REFERENCE TO RELATED APPLICATIONS

This application is a continuation of U.S. patent application Ser. No. 17/652,200, filed Feb. 23, 2022, now U.S. Pat. No. 11,991,398, issued May 21, 2024, which is a continuation of U.S. patent application Ser. No. 16/514,713, filed Jul. 17, 2019, now U.S. Pat. No. 11,290,749, issued Mar. 29, 2022, which claims the benefit of U.S. Provisional Patent Application No. 62/699,588, filed Jul. 17, 2018, the contents of which are incorporated herein by reference in their entirety.

BACKGROUND

In block-based video coding, each frame may have blockiness and/or other coding artifacts. In order to reduce or remove such artifacts, deblocking filtering may be applied. A deblocking filter may have parameters. The deblocking filter parameters may be determined based on a quantization parameter (QP).

SUMMARY

Deblocking filtering may comprise using a deblocking filter having parameters that are adaptively determined. The parameters may comprise a number of borders of a block of pixels of a frame of a video to be filtered and a filter strength. The parameters may be adaptively determined for the block based on perceptual and/or statistical properties of the block and/or the video. For example, the number of borders to be filtered and/or the filter strength may be determined based on a content complexity of the block, such as a texture shown in the block and/or features shown in the block. The number of borders to be filtered and/or the filter strength may be determined based on a viewing characteristic of the video, such as a characteristic of an intended display for viewing the video or a characteristic of an intended setting for viewing the video. The determined number of borders of the block may be filtered using the determined filter strength.

BRIEF DESCRIPTION OF THE DRAWINGS

The following drawings show generally, by way of example, but not by way of limitation, various examples discussed in the present disclosure. In the drawings.

DETAILED DESCRIPTION

Block-based video coding methods may result in frames having blockiness and/or other coding artifacts. In order to reduce or remove such artifacts, deblocking filtering may be applied. A deblocking filter may have parameters. The parameters may comprise a number of borders of a block of pixels of a frame of a video to be filtered and/or a filter strength, as examples.

The parameters may be adaptively determined. As an example, the parameters may be determined for a block of pixels of a frame of a video, for the frame, and/or for the video based on perceptual and/or statistical properties of the block, the frame, and/or the video. The parameters may be determined based on a content complexity of the block, the frame, and/or the video, such as a texture shown in the block and/or features shown in the block, the frame, and/or the video. The parameters may be determined based on a viewing characteristic of the video, such as a characteristic of an intended display for viewing the video or a characteristic of an intended setting for viewing the video. The determined number of borders of the block may be filtered using the determined filter strength.

Figure 1:
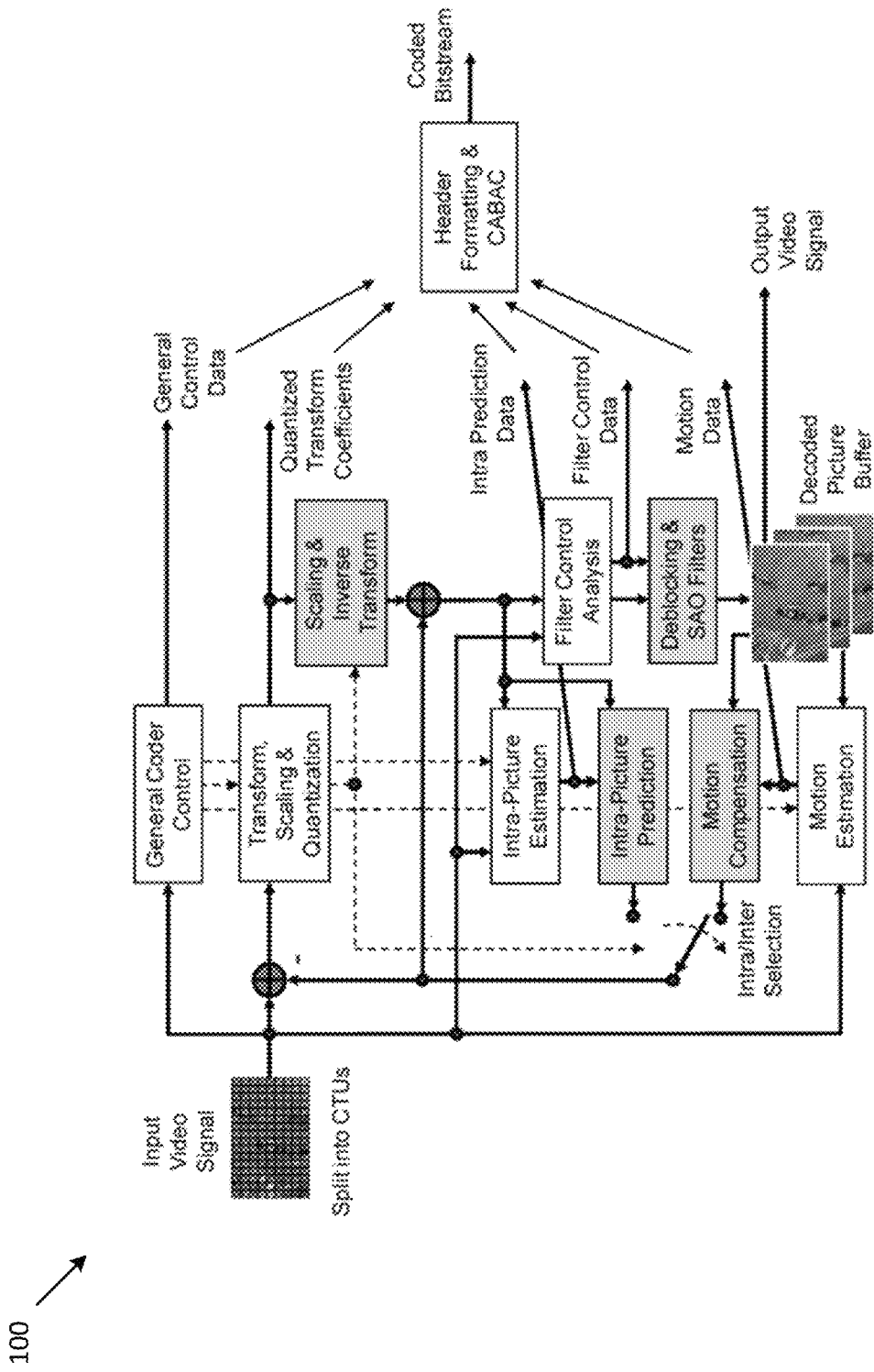
FIG. 1 shows a diagram of an example method.

FIG. 1 shows an example coding method 100. The coding method 100 may be performed by an encoder. The coding method 100 may be performed by a codec. The coding method 100 may comprise a method that conforms to the ITU-T H.264/ISO/IEC 14496-10 (AVC) standard or the ITU-T H.265/ISO/IEC 23008-2 (HEVC) standard. The coding method 100 may comprise a lossy video coding method.

The coding method 100 may comprise receiving a video 101. The video 101 may comprise one or more frames. The frames may show pictures. The frames may comprise pixels. Each of the pixels may have a frequency and/or wavelength that is perceived by the Human Visual System as color. The color may be represented as chroma values in an RGB color space. The color may be represented as chroma values in a YUV color space. Chroma values in the RGB color space may be converted to chroma values in the YUV color space.

One or more of the frames may be split into blocks of pixels, such as rectangular blocks of pixels. The frame may be split into macroblocks. For example, the frame may be split into 16×16 pixels macroblocks, in accordance with the ITU-T H.264 and ISO/IEC 14496-10 (Advanced Video Coding (AVC)) standard. The size of the blocks may be based on a number of details shown in the frame. For example, an area of the frame showing more details may be split into smaller blocks than another area of the frame showing fewer details. An indication of partitioning of the blocks of pixels to may be sent to a decoder.

A chrominance and/or luminance of a block may be determined by sampling pixels of the block. For example, one pixel of a block may be sampled to determine chrominance of the block. Several pixels of the block may be sampled to determine luminance of the block. Other sampling formats may be used.

One or more of the frames may be encoded by intra-picture prediction. Intra-picture prediction may comprise predicting data spatially from block-to-block within the frame. Intra-picture prediction may not depend on other frames of the video.

One or more of the frames may be encoded by inter-picture prediction. Inter-picture prediction may comprise determining motion data. The motion data may be determined for based on the determined chrominance and/or luminance of the blocks. The motion data may comprise a reference frame and a motion vector indicating a pixel of the reference frame with a similar chrominance and/or luminance to one of the sample pixels. The motion data may be sent to the decoder. Mode decision data associated with the inter-picture prediction may be sent to the decoder. The decoder may perform inter-picture prediction using the motion data and mode decision data.

A residual signal may comprise the difference between a block and a corresponding prediction. The residual signal may be transformed from a spatial domain to a frequency domain, such as by discrete cosine transform (DCT), another linear spatial transform, or integer transform proposed by the ITU-T H.264 and ISO/IEC 14496-10 (AVC), or the ITU-T H.265 and ISO/IEC 23008-2 (High-Efficiency Video Coding (HEVC)). The transform may remove redundancy in the data describing intensity of the pixels of the blocks. The transformation may yield a matrix of coefficients for each block. The coefficients may represent spatial frequencies within the block.

The coefficients may be quantized. Quantization may comprise scaling the coefficients by a quantization parameter (QP). For example, quantization may comprise dividing the coefficients by the QP. Quantization may comprise dividing the matrix of coefficients by a matrix of QP's. Quantization may yield a quantized matrix for each block. The quantized matrix may comprise less information and, thus, require less bits to encode. The quantized matrices may be sent to a decoder.

The QP value used may vary across blocks of pixels of a frame. The difference in QP values may be constrained among neighboring blocks. The value of the QP may determine the size of a quantization step (e.g., the coarseness of rounding of the coefficients). Quantization with a higher QP value may result in higher compression. However, a higher QP value may result in more information discarded during quantization, such as loss in precision of frequencies and the removal of frequencies represented by coefficients rounded to zero. Therefore, quantization with a higher QP may alter the appearance of fine textures shown in the block, resulting in blocking (e.g., "blockiness"). The blockiness may be perceptible to the Human Visual System. Quantization with a lower QP value may result in a loss of frequencies that may be imperceptible to the Human Visual System. Yet, quantization with a lower QP may result in more information being retained and lower compression.

The quantized matrices may be entropy encoded. A decoder processing loop may be performed. Based on the encoder performing the decoder processing loop, the encoder and the decoder may generate identical predictions for subsequent data. The decoder processing loop may comprise inverse scaling and inverse transforming the quantized transform coefficients to determine the decoded approximation of the residual signal. The residual signal may be added to the motion data.

The result of the residual signal added to the motion data may be fed to one or more in-loop filters, such as a deblocking filtering and/or sample adaptive offset (SAO). The in-loop filters may remove artifacts caused by the block-wise processing and/or quantization. The in-loop filters may smooth edges of features shown in the reconstructed picture. The in-loop filters may produce a final picture representation. The final picture representation may comprise a duplicate of the output of the decoder. The final picture representation may be stored in a decoded picture buffer. The final picture representation may be used for the prediction of subsequent frames.

To reduce blockiness, such as from block-wise processing and/or quantization, deblocking filtering may be performed. The deblocking filtering may conform to ITU-T H.264 and ISO/IEC 14496-10 (AVC), or ITU-T H.265 and ISO/IEC 23008-2 (HEVC). Deblocking filtering may comprise applying a deblocking filter to a reconstructed picture. Deblocking filtering may improve objective and/or subjective quality of a reconstructed picture, such as quality as perceived by the Human Visual System (HVS). Deblocking filtering may enhance continuity of block boundaries (e.g., borders, edges, etc.). For example, deblocking filtering may remove coding artifacts and/or increase coding gain. Deblocking filtering, when applied to a frame used as a reference frame for motion-compensated prediction of subsequent frame, may result in an increase in coding efficiency and, thus, bitrate savings.

A decoder may perform filtering decisions and/or operations in synchronization with the encoder. As a result, deblocking filtering and/or other in-loop filtering operations may ensure a level of quality of the picture that is output, such as across decoders of different manufacturers. However, if the deblocking filter is too strong, the deblocking filtering may result in blurring of features in the blocks.

The deblocking filter may have one or more parameters, depending on a particular codec. For example, it may have a $\beta$ threshold parameter and a $t_c$ threshold parameter. The $\beta$ threshold parameter may be used to determine a number of vertical and/or horizontal block borders to be filtered. The $t_c$ threshold parameter may be used to determine a filter strength. The $t_c$ threshold parameter may be used to determine a number of pixels from the block borders to be modified. The $t_c$ threshold parameter may be used to determine a maximum absolute value of modifications allowed for pixel values. The maximum absolute value of modifications may limit blurriness caused by the deblocking filtering. The determined number of block borders may be filtered using the determined filter strength. For example, the determined number of pixels from the block borders may be modified for the determined number of vertical and/or horizontal block borders.

Currently, the $\beta$ threshold parameter and the $t_c$ threshold parameter may be determined by a human operator. The human operator may determine the $\beta$ threshold parameter and a $t_c$ threshold parameter arbitrarily. The human operator may determine the $\beta$ threshold parameter and a $t_c$ threshold parameter based on a reference. Currently, a same $\beta$ threshold parameter and a same $t_c$ threshold parameter may be determined for different blocks of pixels of a frame, for different frames of a video, and/or for a complete workflow for a large amount of sequences.

According to the H.265/MPEG-HEVC standard, the $\beta$ threshold parameter and the $t_c$ threshold parameter may be determined based on the value of the QP used for quantization. The $\beta$ threshold parameter and the $t_c$ threshold parameter may be determined based on the value of the QP used for quantization because blocking artifacts may be the consequence of block transform and quantization. The $\beta$ threshold parameter and the $t_c$ threshold parameter may be determined for a block of pixels based on a QP value used for neighboring blocks having a common border with the block. For example, the $\beta$ threshold parameter and the $t_c$ threshold parameter may be determined based on an average QP value of two neighboring blocks having a common border. Improvements in the efficiency of determining the $\beta$ threshold parameter and the $t_c$ threshold parameter, such as for high resolution (UHD), high bit depth, and/or high dynamic range (HDR) video, are needed.

Figure 2:
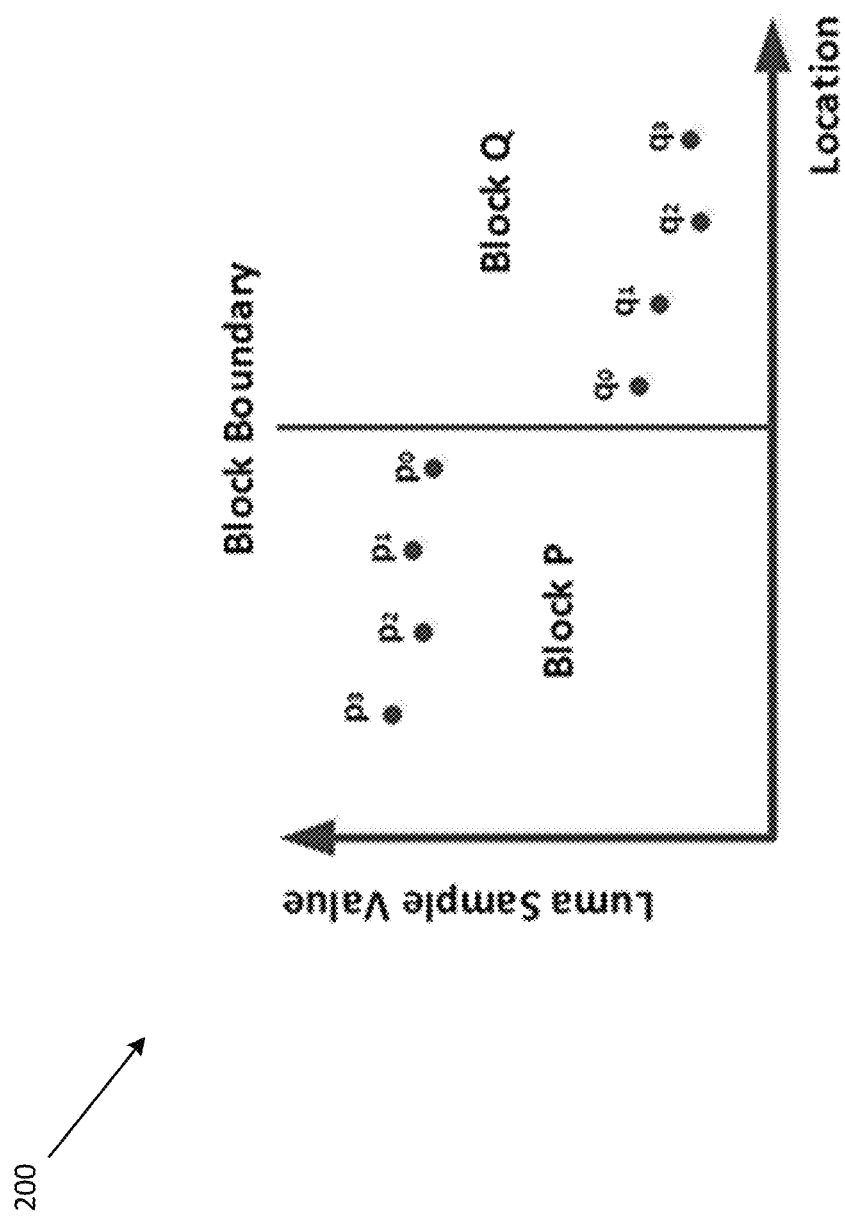
FIG. 2 shows example blocks of pixels.

FIG. 2 shows neighboring blocks of pixels of a frame of a video, Block P and Block Q. Block P and Block Q may be separated by a block boundary. Sample pixels p0, p1, p2, p3 in Block P may correspond to sample pixels q0, q1, q2, q3 in Block Q. As shown in FIG. 2, there may be variance between sample pixels in Block P p0, p1, p2, p3 and the corresponding sample pixels q0, q1, q2, q3 in Block Q, such as a variance in luma value. The variance may result from quantization, block-based transformation, and/or motion compensation of the blocks. The variance in values of pixels in Block P near the block boundary and pixels in Block Q near the block boundary may result in visually noticeable discontinuities along boundaries of blocks. The variance may result in blocking artifacts at the block boundaries. The blocking artifacts may be perceptible to the Human Visual System. The blocking artifacts may decrease the overall picture quality of the frame. As shown in FIG. 2, relatively low spatial activity on opposite sides of the block boundary may indicate the blocking artifacts and/or a discontinuity at the block boundary. Quantization using a larger QP may result in greater distortion of boundaries, as more data may be lost. Motion-compensated prediction may result in discontinuities in the interior of blocks. Deblocking filtering may be performed to reduce the discontinuities and/or smooth the boundaries.

Figure 3:
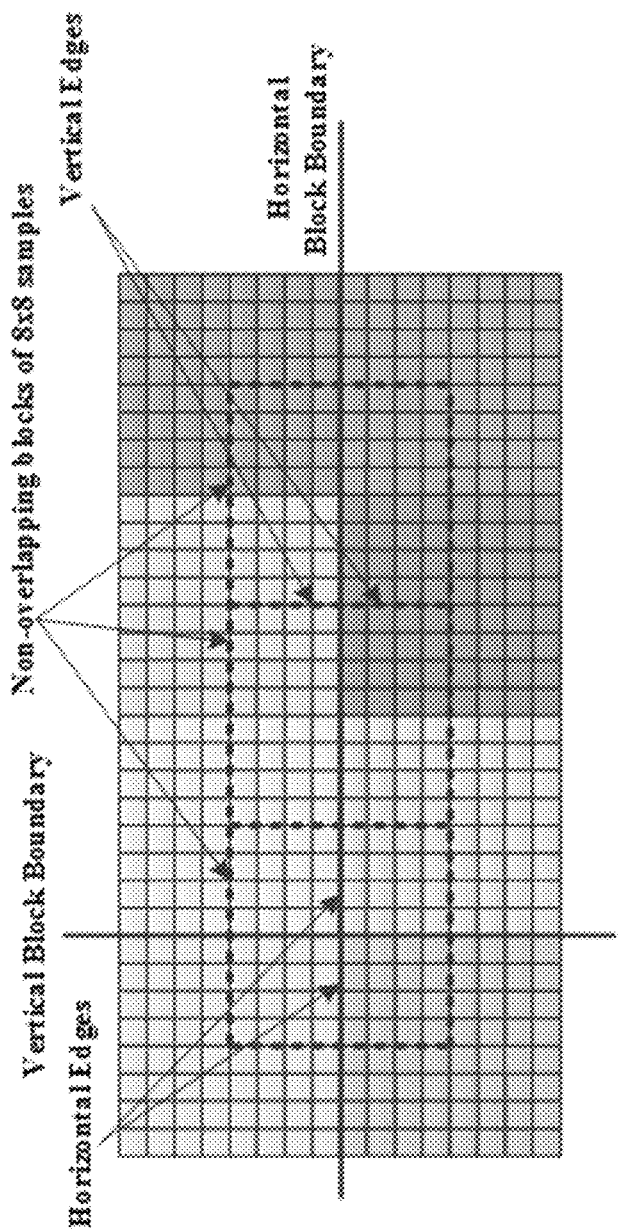
FIG. 3 shows example blocks of pixels.

FIG. 3 shows example blocks of pixels of a frame of a video. Deblocking filtering may be performed on the frame. The deblocking filtering may be performed on non-overlapping blocks of pixels. The deblocking filtering may be performed on 4×4 pixel blocks positioned on a grid splitting the frame into 4×4 pixel samples, such as in conformity with the H.264/MPEG-AVC standard. As shown in FIG. 3, the deblocking filtering may be performed on 8×8 pixel blocks positioned on a grid splitting the frame into 8×8 pixel samples, such as in conformity the H.265/MPEG-HEVC standard. Deblocking filtering 8×8 pixel blocks, as opposed to 4×4 pixel blocks, for example, may reduce computational complexity. However, deblocking filtering 8×8 pixel blocks, as opposed to 4×4 pixel blocks, may result in reduced overall picture quality. As a result, picture quality may trade-off with computational simplicity. Deblocking filtering may be performed on 4×4 pixel blocks and 8×8 pixel blocks. For example, 4×4 pixel blocks may be used in areas with relatively high spatial and/or temporal activity. The blocks may be deblocked in parallel.

Figure 4:
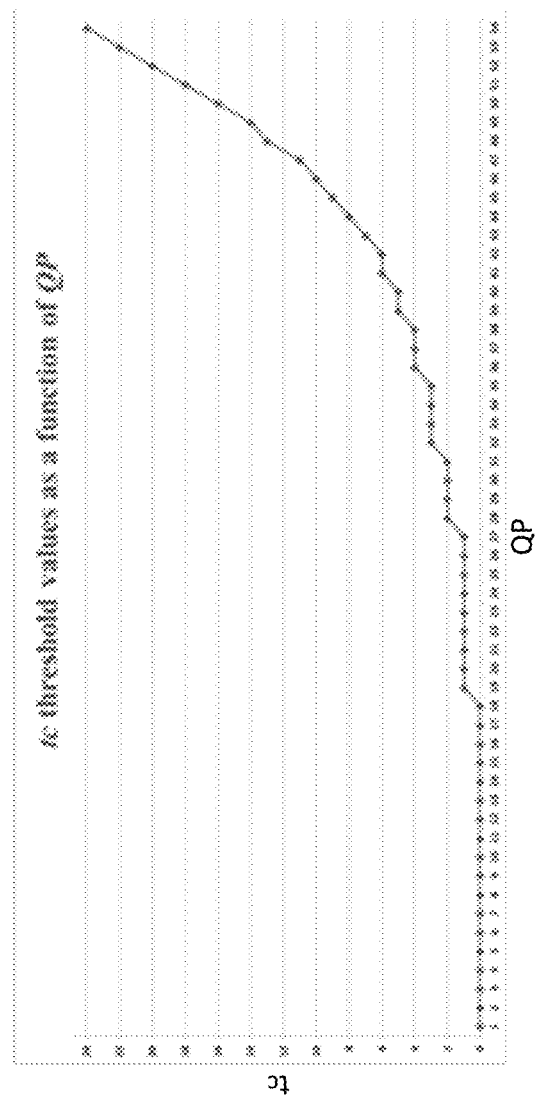
FIG. 4 shows an example deblocking filtering parameter graph.

FIG. 4 shows an example relationship between QP values and $t_c$ threshold parameter values. At low QP values, the $t_c$ threshold parameter may have a value of 0. Above a particular QP value, the value of the QP and the value of the $t_c$ threshold parameter may be directly proportional. For example, the $t_c$ threshold parameter may have a value of 0 for QP values less than or equal to a particular value, such as 15. The $t_c$ threshold parameter having a value of 0 for QP values less than or equal to a particular value may disable deblocking and/or may reduce computational resources used for in-loop filtering. For QP values greater than 15, a greater QP value may result in a greater value of the $t_c$ threshold parameter. As a result of the $t_c$ threshold parameter increasing directly with the QP value, more deblocking may be performed based on use of a greater QP value.

Figure 5:
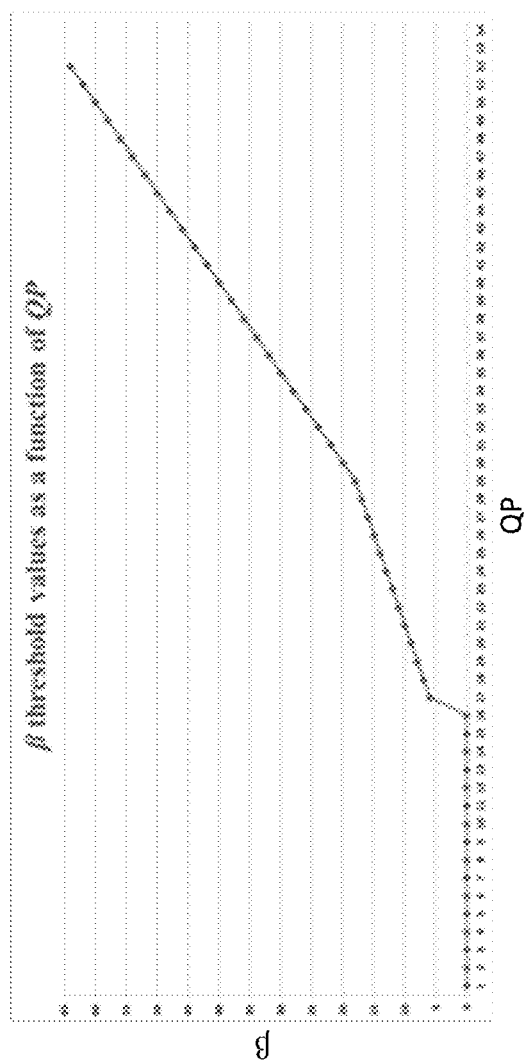
FIG. 5 shows an example deblocking filtering parameter graph.

FIG. 5 shows an example relationship between QP values and β threshold parameter values. At low QP values, the β threshold parameter may have a value of 0. Above a particular QP value, the value of the QP and the value of the β threshold parameter may be directly proportional. For example, the β threshold parameter may have a value of 0 for QP values less than or equal to 15. For QP values greater than 15, a greater QP value may result in a greater value of the β threshold parameter.

Methods are needed for adaptively and efficiently deblocking filtering. The methods may comprise adaptively determining the β threshold parameter and/or the $t_c$ threshold parameter. The methods may provide a low computational complexity deblocking filter, such as for expedited coding.

The methods may comprise determining the β threshold parameter and/or the $t_c$ threshold parameter of a deblocking filter for a block of pixels based on a complexity of the block of pixels. The complexity of the block may comprise a complexity of a feature or texture shown in the block. For example, a higher $t_c$ threshold parameter may be determined for a block showing a flat area, such as a blue sky or white clouds, than a block showing a relatively complex texture, such as a tree with leaves, a forest, or sparkling water. For example, a higher β threshold parameter may be determined for a block showing a flat area than a block showing a relatively complex texture. The β threshold parameter and/or the $t_c$ threshold parameter for a block may be determined based on the β threshold parameter and/or the $t_c$ threshold parameter previously determined for neighboring blocks, such as in order to minimize variations in deblocking filter strength applied to neighboring blocks and, as a result, observed by the Human Visual System.

The complexity of a block may be determined based on a number of details or features shown in the block. The complexity of a block may be determined based on variation of pixels in the block. The complexity of a block may be determined according to any of several methods.

The methods may comprise determining the β threshold parameter and/or the $t_c$ threshold parameter based on a desired perceptual visual quality of the video, such as displayed to an end-user and as perceived by the Human Visual System. The β threshold parameter and/or the $t_c$ threshold parameter may be determined based on one or more viewing and/or perceptual characteristics associated with the desired perceptual visual quality of the video. The viewing characteristic may comprise an intended distance between a viewer of the video and a display of the video. For example, a lesser deblocking filter strength and/or less borders may be filtered based on a greater distance, as blocking artifacts may be less noticeable at greater distances from a display. The viewing characteristic may comprise a resolution of the video. The viewing characteristic may comprise a display width of the video. The viewing characteristic may comprise a viewing angle of the video. The viewing characteristic may comprise a display pixel density of the video. The viewing characteristic may comprise an intended and/or expected ambient illumination of a viewing setting of the video. The viewing characteristic may comprise a pixel dimension of a sinusoidal grating cycle on the display of the video. Determining the β threshold parameter and/or the $t_c$ threshold parameter based on the viewing characteristic may minimize the use of in-loop filter computational complexity resources and/or may expedite the coding process by minimizing the number of pixels processed. Also, determining the β threshold parameter and/or the $t_c$ threshold parameter may be done according to a Contrast Sensitivity Function (CSF). The CSF may be based on a Human Visual System (HVS) nonlinear transformation model followed by a Modulation Transfer Function (MTF). Also, the CSF may be generated, for example, in accordance with one or more of the following: Barten (Ramp) threshold and Schreiber threshold.

Determining the β threshold parameter and/or the $t_c$ threshold parameter may comprise determining an offset. The offset may be divided by a value. For example, the offset may be divided by 2. The result of the offset divided by the value may be added to the QP value used. The result of the offset divided by the value added to the QP value may be used to determine β threshold parameter and/or the $t_c$ threshold parameter, such as by determining the corresponding β threshold parameter and/or the $t_c$ threshold parameter using the table/graph in FIG. 3 and/or the table/graph in FIG. 4. The offset may be determined adaptively. The offset may vary according to the texture and/or content complexity of one or more blocks of pixels of a frame. As a result, the deblocking filter strength and/or the number of borders to be filtered may be adapted based on video content properties.

A hierarchical coding structure may be used to quantize and/or deblocking filter one or more frames of a video. The hierarchical coding structure may comprise using QP cascading. The QP cascading may increase overall coding gain. The hierarchical coding structure may comprise coding different hierarchical levels using different QP values. For example, lower QP values may be used for lower hierarchical levels and higher QP values may be used for higher hierarchical levels. The hierarchical coding structure may comprise using a stronger deblocking filter strength for hierarchical levels coded with higher QP values, such as to remove coding artifacts resulting from the use of higher QP values and/or coarser coding mode decisions.

An a posteriori deblocking filter adaptation may comprise deblocking filtering applied to a block after coding the block. Deblocking filtering may be applied to the block after coding the block and blocks immediately neighboring the block. Blockiness of the encoded block may be determined. For example, determining the blockiness may comprise determining pixel differences across borders of the block. Determining the blockiness may comprise comparing differences between border pixels of neighboring blocks to differences between adjacent pixels within each block. The a posteriori deblocking filter adaptation may be applied to a block after coding the block as a second pass in a two-pass file coding process. The a posteriori deblocking filter adaptation may be applied to a block as a same pass frame coding process.

For example, the a posteriori deblocking filter adaptation may be performed after all blocks neighboring a block have been encoded. For a block B(i,j), the neighboring blocks may comprise blocks B(i−1, j), B(i+1, j), B(i,j−1), and B(i,j+1). The encoder may make regular coding decisions. The encoder my update the reconstructed frame. The encoder may store information sufficient to encode a block in memory. The information may comprise partition/quadtree information, motion vectors, and residuals, as examples. The encoder may not apply entropy coding (e.g., Context-Adaptive Binary Arithmetic Coding (CABAC)) after coding the blocks and/or before the a posteriori deblocking filter adaptation. After neighboring blocks are encoded, the a posteriori deblocking filter adaptation may be performed. Entropy coding may be performed after the a posteriori deblocking filter adaptation.

The described methods and systems for adaptive deblocking filtering may be used to optimally remove blocking artifacts from frames of a video without post-processing the video. The described methods and systems for adaptive deblocking filtering may improve visual quality of a deblocked video while reducing computational complexity.

Figure 6:
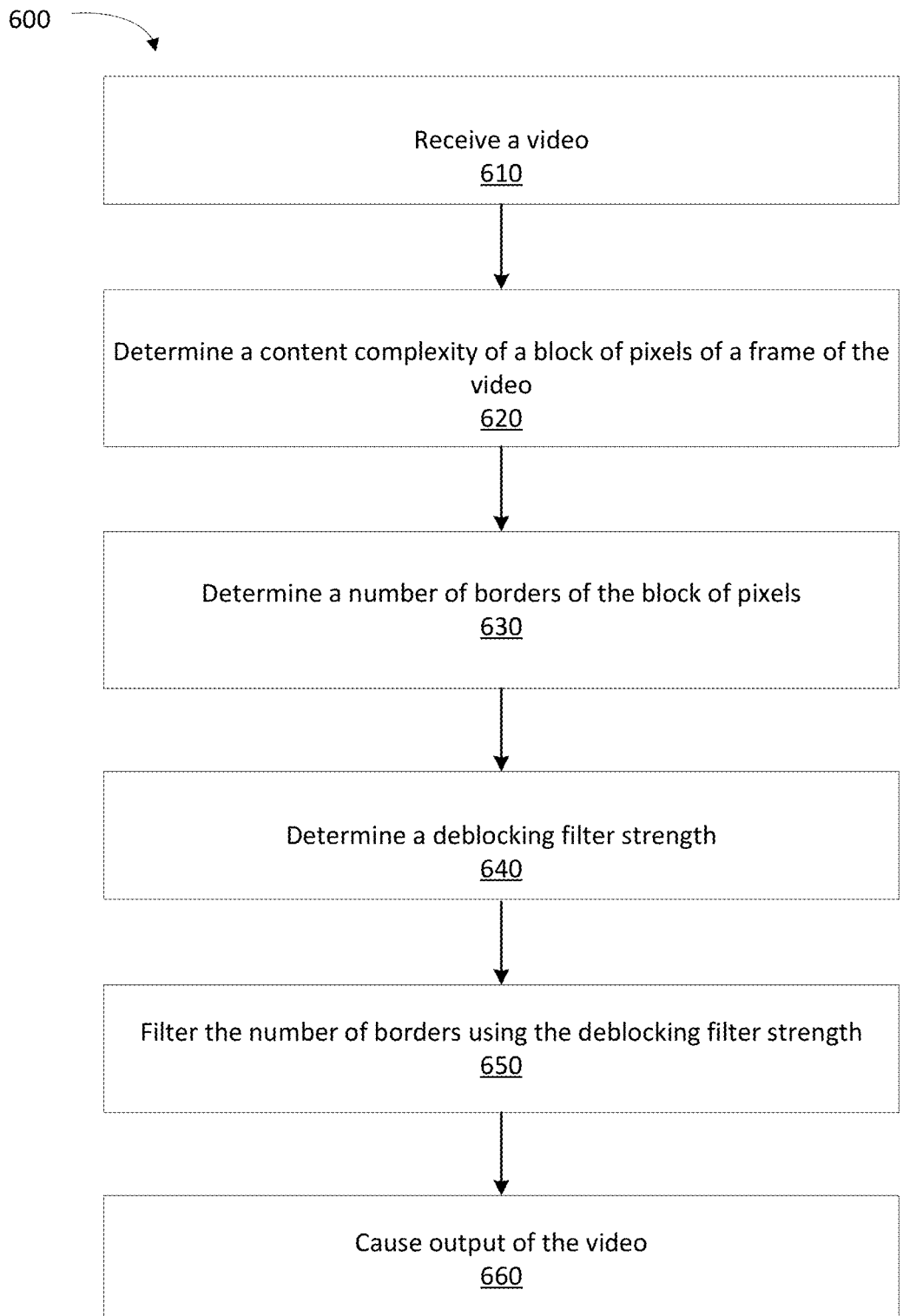
FIG. 6 shows a flow diagram of an example method.

FIG. 6 shows an example method 600. At step 610, a video may be received. The video may be received by an encoder. The video may be received by a codec. The video may be received by a decoder. The video may comprise Standard Dynamic Range (SDR) video. The video may comprise High Dynamic Range (HDR) video. The video may comprise high depth video, such as 10 bit depth video, or low bit depth video. The video may comprise high or standard dynamic range video. The video may comprise high resolution video, such as 4K resolution video having a resolution of 3840×2160 pixels, or low resolution video. The method 600 may be more efficient for higher resolution video, higher bit depth video, and higher dynamic range video. The video may comprise one or more frames. A frame of the video may comprise a plurality of pixels. The pixels may be divided into blocks, such as 4×4 pixel blocks, 8×8 pixel blocks, 16×16 pixel blocks and the like.

At step 620, a content complexity of one or more blocks of pixels of the frame of the video may be determined. The complexity of the block may comprise a complexity of a feature or texture shown in the block. For example, a block showing a flat area may have a lower complexity than a block showing a relatively complex texture. The complexity of a block may be determined based on a number of details or features shown in the block. The complexity of the block may be determined based on variation of pixels in the block. The complexity of the block may be determined according to any of several methods.

At step 630, a number of borders of the block of pixels may be determined. The number of borders of the block of pixels may be determined based on a β threshold parameter. The β threshold parameter may be determined based on the content complexity. For example, a higher β threshold parameter may be determined for a block showing a flat area than a block showing a relatively complex texture.

Determining the β threshold parameter may comprise determining an offset. The offset may be divided by a value. For example, the offset may be divided by 2. The result of the offset divided by the value may be added to the QP value used. The result of the offset divided by the value added to the QP value may be used to determine β threshold parameter, such as by determining the corresponding β threshold parameter using the table/graph in FIG. 4. The offset may be determined adaptively. The offset may vary according to the texture and/or content complexity of one or more blocks of pixels of a frame.

At step 640, a deblocking filter strength may be determined. The deblocking filter strength may be determined based on a $t_c$ threshold parameter. The $t_c$ threshold parameter may be determined based on the content complexity. For example, a higher $t_c$ threshold parameter may be determined for a block showing a flat area than a block showing a relatively complex texture.

Determining the $t_c$ threshold parameter may comprise determining an offset. The offset may be divided by a value. For example, the offset may be divided by 2. The result of the offset divided by the value may be added to the QP value used. The result of the offset divided by the value added to the QP value may be used to determine $t_c$ threshold parameter, such as by determining the corresponding $t_c$ threshold parameter using the table/graph in FIG. 3. The offset may be determined adaptively. The offset may vary according to the texture and/or content complexity of one or more blocks of pixels of a frame.

At step 650, the number of borders may be filtered using the deblocking filter strength. At step 660, the video may be caused to be output. The block having the filtered borders may be caused to be output. A frame having the block having the filtered borders may be caused to be output. The video may be caused to be output by sending the video, such as by streaming the video. The video may be sent to a user device, a display device, a mobile device, and/or another computing device, as examples. The video may be caused to be output by displaying, such as via a display. The video may be caused to be output by storing the video, such as on an external storage device, a user device, a portable device, a cloud device, and/or a portion of a partitioned memory.

Steps 610-650 may be performed for a plurality of blocks in the frame. Method 600 may be performed as a single pass video frame coding workflow. Method 600 may be performed as a double-pass video frame coding workflow. Method 600 may be incorporated in an existing or new video codec standard.

For example, an encoder may receive a video. The video may comprise frames showing a tree with leaves blowing in the wind against a backdrop of a clear sky. The encoder may determine a content complexity of a block of pixels of one of the frames showing a portion of the leaves. The encoder may determine a content complexity of a block of pixels of the frame showing the clear sky. The encoder may determine a higher content complexity of the block of pixels showing the leaves than the block of pixels showing the clear sky.

Based on the content complexities, the encoder may determine a number of borders of each of the frames to be deblocking filtered. Based on the content complexities, the encoder may determine a deblocking filter strength for each of the blocks. The encoder may determine the deblocking filter strength for each of the blocks based on deblocking filter strengths determine for adjoining blocks. For example, the encoder may determine a deblocking filter strength for the block showing the portion of the leaves based, in part, on another block showing the portion of the leaves adjacent to the block. The encoder may filter the determined number of borders of each of the blocks using the deblocking filter strengths determined for each of the blocks.

Figure 7:
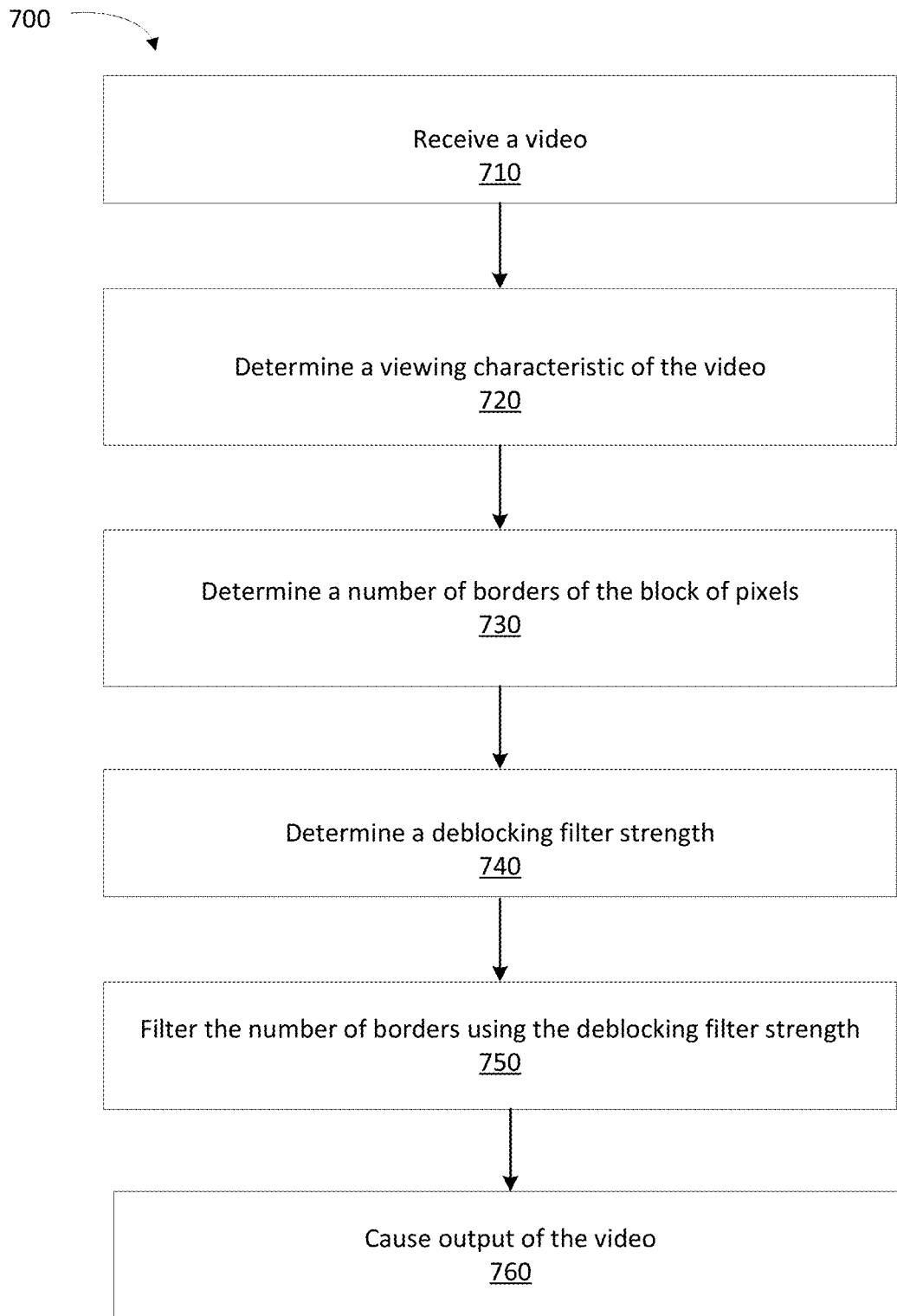
FIG. 7 shows a flow diagram of an example method.

FIG. 7 shows an example method 700. At step 610, a video may be received. The video may be received by an encoder. The video may be received by a codec. The video may be received by a decoder. The video may comprise one or more frames. A frame of the video may comprise a plurality of pixels. The pixels may be divided into blocks, such as 4×4 pixel blocks or 8×8 pixel blocks.

At step 720, a viewing characteristic of the video may be determined. The viewing characteristic may comprise an intended distance between a viewer of the video and a display outputting the video. The viewing characteristic may comprise a resolution of the video. The viewing characteristic may comprise a display width of the video. The viewing characteristic may comprise a viewing angle of the video. The viewing characteristic may comprise a display pixel density of the video. The viewing characteristic may comprise an intended and/or expected ambient illumination of a viewing setting of the video. The viewing characteristic may comprise a pixel dimension of a sinusoidal grating cycle on the display of the video. The viewing characteristic may comprise a reflection coefficient of the SDR/HDR video display.

At step 730, a number of borders of the block of pixels may be determined. The number of borders of the block of pixels may be determined based on a β threshold parameter. The β threshold parameter may be determined based on the viewing characteristic. For example, a higher β threshold parameter may be determined for a video that is intended to be viewed at a larger viewing distance. For example, a smaller β threshold parameter may be determined for a video that is intended to be viewed on a device with a wider display width.

Determining the β threshold parameter may comprise determining an offset. The offset may be divided by a value. For example, the offset may be divided by 2. The result of the offset divided by the value may be added to the QP value used. The result of the offset divided by the value added to the QP value may be used to determine β threshold parameter, such as by determining the corresponding β threshold parameter using the table/graph in FIG. 4. The offset may be determined adaptively. The offset may vary according to the texture and/or content complexity of one or more blocks of pixels of a frame.

At step 740, a deblocking filter strength may be determined. The deblocking filter strength may be determined based on a $t_c$ threshold parameter. The $t_c$ threshold parameter may be determined based on the viewing characteristic. For example, a lower $t_c$ threshold parameter may be determined for a video that is intended to be viewed in lower ambient lighting level.

Determining the $t_c$ threshold parameter may comprise determining an offset. The offset may be divided by a value. For example, the offset may be divided by 2. The result of the offset divided by the value may be added to the QP value used. The result of the offset divided by the value added to the QP value may be used to determine $t_c$ threshold parameter, such as by determining the corresponding $t_c$ threshold parameter using the table/graph in FIG. 3. The offset may be determined adaptively. The offset may vary according to the texture and/or content complexity of one or more blocks of pixels of a frame.

At step 750, the number of borders may be filtered using the deblocking filter strength. At step 760, the video may be caused to be output. The block having the filtered borders may be caused to be output. A frame having the block having the filtered borders may be caused to be output. The video may be caused to be output by sending the video, such as by streaming the video. The video may be sent to a user device, a display device, a mobile device, and/or another computing device, as examples. The video may be caused to be output by displaying, such as via a display. The video may be caused to be output by storing the video, such as on an external storage device, a user device, a portable device, a cloud device, and/or a portion of a partitioned memory.

Steps 710-750 may be performed for a plurality of blocks in the frame. Method 700 may be performed as a single pass video frame coding workflow. Method 700 may be performed as a double-pass video frame coding workflow. Method 700 may be incorporated in an existing or new video codec standard.

For example, a decoder may receive a video from an encoder. The video may show a children's show. The decoder may determine that the video is intended to be viewed at a distance of five to seven feet from a display. The decoder may determine that the video is intended to be viewed on a device with a display of twenty-four inches to fifty-five inches. The decoder may determine that the video is intended to be viewed in a brightly-lit environment.

Based on the viewing characteristics, the decoder may determine a number of borders of blocks of pixels of frames of the video to be deblocking filtered. Based on the viewing characteristics, the decoder may determine a deblocking filter strength for each of the blocks. The decoder may filter the determined number of borders of each of the blocks using the deblocking filter strengths determined for each of the blocks.

Figure 8:
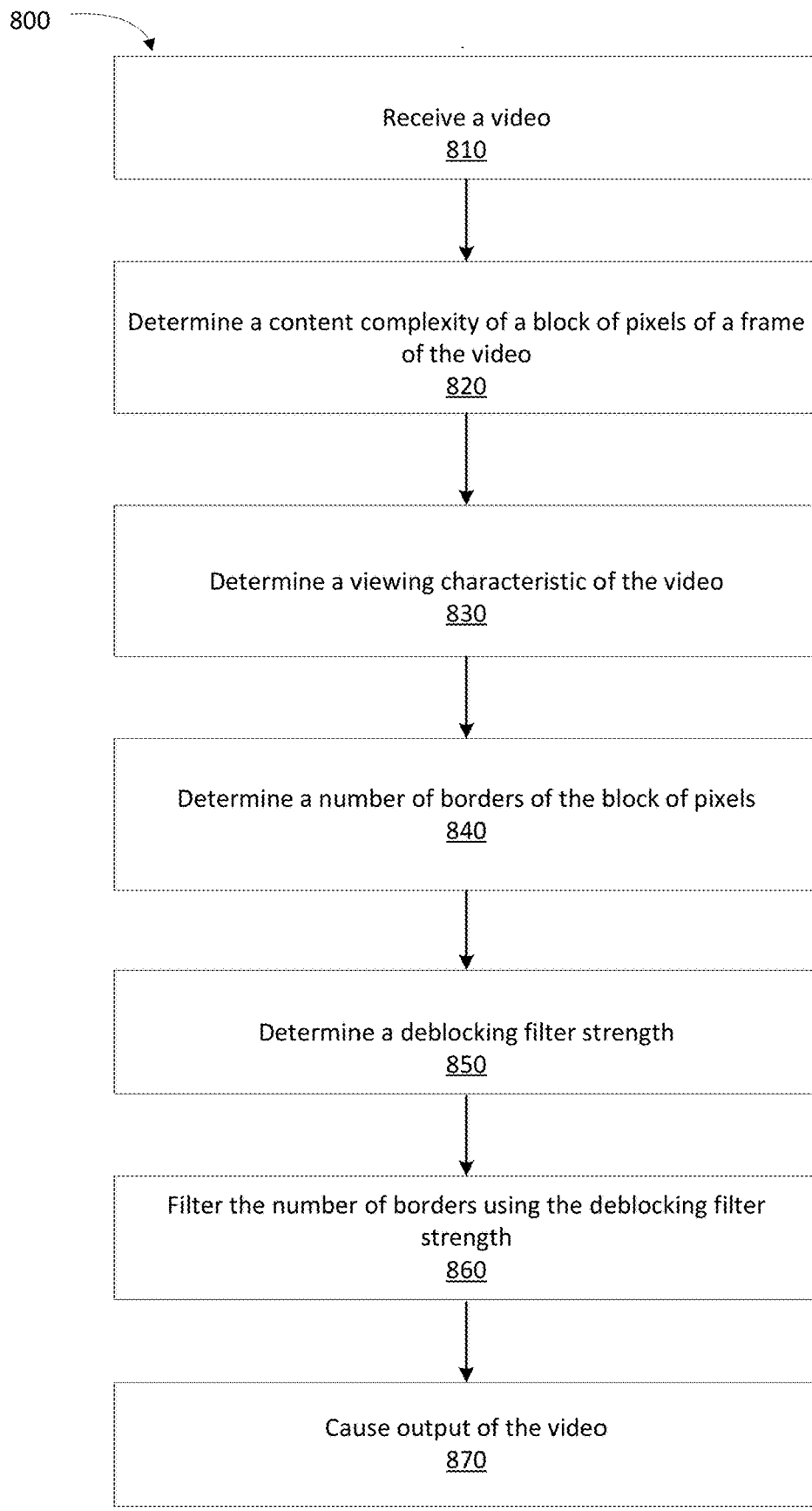
FIG. 8 shows a flow diagram of an example method.

FIG. 8 shows an example method 800. At step 810, a video may be received. The video may be received by an encoder. The video may be received by a decoder. The video may comprise one or more frames. A frame of the video may comprise a plurality of pixels. The pixels may be divided into blocks, such as 4×4 pixel blocks or 8×8 pixel blocks.

At step 820, a content complexity of a block of pixels of a frame of the video may be determined. The complexity of the block may comprise a complexity of a feature or texture shown in the block. For example, a block showing a flat area may have a lower complexity than a block showing a relatively complex texture. The complexity of a block may be determined based on a number of details or features shown in the block. The complexity of the block may be determined based on variation of pixels in the block. The complexity of the block may be determined according to any of several methods.

At step 830, a viewing characteristic of the video may be determined. The viewing characteristic may comprise an intended distance between a viewer of the video and a display of the video. The viewing characteristic may comprise a resolution of the video. The viewing characteristic may comprise a display width of the video. The viewing characteristic may comprise a viewing angle of the video. The viewing characteristic may comprise a display pixel density of the video. The viewing characteristic may comprise an intended and/or expected ambient illumination of a viewing setting of the video. The viewing characteristic may comprise a pixel dimension of a sinusoidal grating cycle on the display of the video. The viewing characteristic may comprise a reflection coefficient of the SDR/HDR video display. Step 830 may be performed before, after, or contemporaneous to step 820.

At step 840, a number of borders of the block of pixels may be determined. The number of borders of the block of pixels may be determined based on a β threshold parameter. The β threshold parameter may be determined based on the viewing characteristic. For example, a higher β threshold parameter may be determined for a video that is intended to be viewed at a smaller viewing distance. For example, a smaller β threshold parameter may be determined for a video that is intended to be viewed on a device with a wider display width.

Determining the β threshold parameter may comprise determining an offset. The offset may be divided by a value. For example, the offset may be divided by 2. The result of the offset divided by the value may be added to the QP value used. The result of the offset divided by the value added to the QP value may be used to determine β threshold parameter, such as by determining the corresponding β threshold parameter using the table/graph in FIG. 4. The offset may be determined adaptively. The offset may vary according to the texture and/or content complexity of one or more blocks of pixels of a frame.

At step 850, a deblocking filter strength may be determined. The deblocking filter strength may be determined based on a $t_c$ threshold parameter. The $t_c$ threshold parameter may be determined based on the viewing characteristic. For example, a lower $t_c$ threshold parameter may be determined for a video that is intended to be viewed in lower ambient lighting level.

Determining the $t_c$ threshold parameter may comprise determining an offset. The offset may be divided by a value. For example, the offset may be divided by 2. The result of the offset divided by the value may be added to the QP value used. The result of the offset divided by the value added to the QP value may be used to determine $t_c$ threshold parameter, such as by determining the corresponding $t_c$ threshold parameter using the table/graph in FIG. 3. The offset may be determined adaptively. The offset may vary according to the texture and/or content complexity of one or more blocks of pixels of a frame.

At step 860, the number of borders may be filtered using the deblocking filter strength. At step 870, the video may be caused to be output. The block having the filtered borders may be caused to be output. A frame having the block having the filtered borders may be caused to be output. The video may be caused to be output by sending the video, such as by streaming the video. The video may be sent to a user device, a display device, a mobile device, and/or another computing device, as examples. The video may be caused to be output by displaying, such as via a display. The video may be caused to be output by storing the video, such as on an external storage device, a user device, a portable device, a cloud device, and/or a portion of a partitioned memory. Steps 810-860 may be performed for a plurality of blocks in the frame. Method 800 may be performed as a single pass video frame coding workflow. Method 800 may be performed as a double-pass video frame coding workflow. Method 800 may be incorporated in an existing or new video codec standard.

For example, an encoder may receive a video. The video may comprise frames showing a baseball game. The encoder may determine a content complexity of a block of pixels of one of the frames showing a baseball traveling mid-air. The encoder may determine a content complexity of a block of pixels of the frame showing a portion of a ground of a baseball field. The encoder may determine a higher content complexity of the block of pixels showing the traveling baseball than the block of pixels showing the portion of the ground.

The encoder may determine that the video is intended to be viewed on a device with a 1920×1080 pixel resolution. The encoder may determine that the video is intended to be viewed on a device with a 300 or 3000 pixels per inch pixel density, for example.

Based on the content complexities and/or the viewing characteristics, the encoder may determine a number of borders of each of the frames to be deblocking filtered. Based on the content complexities and/or the viewing characteristics, the encoder may determine a deblocking filter strength for each of the blocks. The encoder may filter the determined number of borders of each of the blocks using the deblocking filter strengths determined for each of the blocks.

Figure 9:
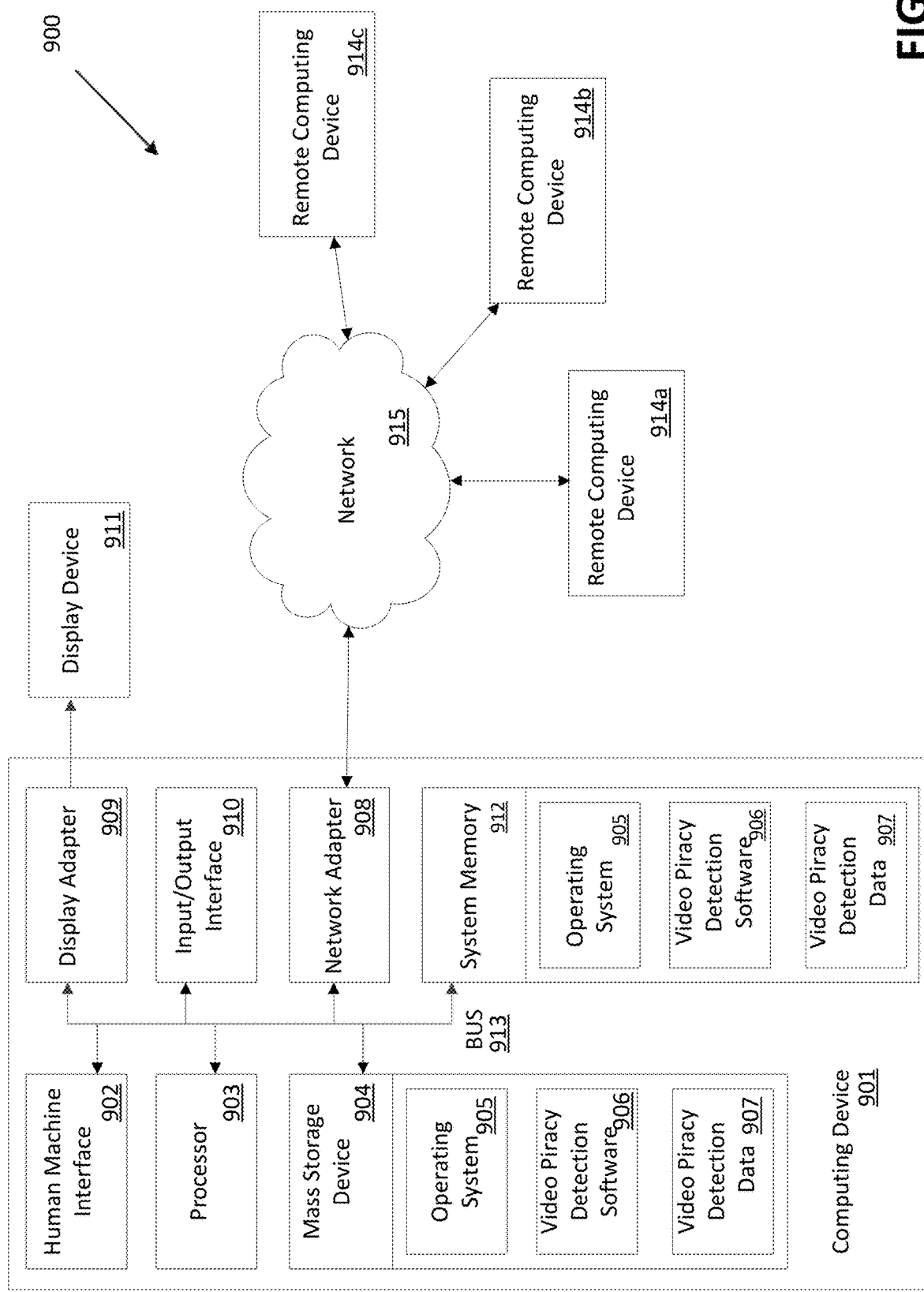
FIG. 9 shows an example computing environment.

FIG. 9 shows an exemplary operating environment 600 for performing the disclosed methods. This exemplary operating environment is only an example of an operating environment and is not intended to suggest any limitation as to the scope of use or functionality of operating environment architecture. Neither should the operating environment be interpreted as having any dependency or requirement associated with any one or combination of components shown in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

The systems and methods disclosed herein may be implemented via a general-purpose computing device in the form of a computing device 901. The components of the computing device 901 may comprise, but are not limited to, one or more processors or processing units 903, a system memory 912, and a system bus 913 that couples various system components including the processor 903 to the system memory 912. In the case of multiple processing units 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may be implemented over a wired or wireless network connection and each of the subsystems, including the processor 903, a mass storage device 904, an operating system 905, coding software 906, coding data 907, a network adapter 908, system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system.

The computing device 901 typically comprises a variety of computer readable media. Example readable media may be any available media that is accessible by the computing device 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data and/or program modules such as operating system 905 and coding software 906 that are immediately accessible to and/or are presently operated on by the processing unit 903.

The computing device 901 may comprise other removable/non-removable, volatile/non-volatile computer storage media. By way of example, FIG. 9 shows a mass storage device 904 which may provide non-volatile storage of computer code, computer readable instructions, data structures, program modules, and other data for the computing device 901. For example and not limitation, a mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, an operating system 905 and coding software 906. Each of the operating system 905 and coding software 906 (or some combination thereof) may comprise elements of the programming and the coding software 906. Coding data 907 may be stored on the mass storage device 904. Coding data 907 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 901 via an input device (not shown). Examples of such input devices may comprise, but are not limited to, a keyboard, pointing device (e.g., a "mouse"), a microphone, a joystick, a scanner, tactile input devices such as gloves, and other body coverings, and the like. These and other input devices may be connected to the processing unit 903 via a human machine interface 902 that is coupled to the system bus 913, but may be connected by other interface and bus structures, such as a parallel port, game port, an Institute of Electrical and Electronics Engineers (IEEE) 994 Port (also known as a Firewire port), a serial port, or a universal serial bus (USB).

A display device 911 may be connected to the system bus 913 via an interface, such as a display adapter 909. It is contemplated that the computing device 901 may have more than one display adapter 909 and the computer 901 may have more than one display device 911. For example, a display device may comprise a monitor, a Liquid Crystal Display (LCD), or a projector. In addition to the display device 911, other output peripheral devices may comprise components such as speakers (not shown) and a printer (not shown) which may be connected to the computing device 901 via Input/Output Interface 910. Any step and/or result of the methods may be output in any form to an output device. Such output may comprise any form of visual representation, including, but not limited to, textual, graphical, animation, audio, tactile, and the like. The display 911 and computing device 901 may comprise part of one device, or separate devices.

The computing device 901 may operate in a networked environment using logical connections to one or more remote computing devices 914a,b,c. By way of example, a remote computing device may comprise a personal computer, a portable computer, a smart phone, a server, a router, a network computer, a peer device or other common network connections between the computing device 901 and a remote computing device 914a,b,c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Example application programs and other executable program components such as the operating system 905 are shown herein as discrete blocks, although such programs and components may reside at various times in different storage components of the computing device 901, and may be executed by the data processor(s) of the computer. An implementation of coding software 906 may be stored on or sent across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A non-transitory computer-readable medium storing instructions that, when executed, cause:
    receiving a video;
    determining a content complexity of at least one block of pixels of a frame of the video based on a variation of the pixels;
    determining, based on the content complexity and a display pixel density of the video, a number of borders of the at least one block of pixels;
    filtering, based on the content complexity, the number of borders of the at least one block of pixels; and
    causing output of the filtered at least one block of pixels.

2. The non-transitory computer-readable medium of claim 1, wherein the content complexity comprises a feature associated with the at least one block of pixels.

3. The non-transitory computer-readable medium of claim 1, wherein the instructions, when executed, further cause determining a number of features associated with the at least one block of pixels, and wherein the content complexity is based at least in part on the determined number of features.

4. The non-transitory computer-readable medium of claim 1, wherein the determining the number of borders of the at least one block of pixels is further based at least in part on a pixel dimension of a sinusoidal grating cycle on display of the video.

5. The non-transitory computer-readable medium of claim 1, wherein the determining the number of borders of the at least one block of pixels is further based at least in part on a quantization parameter used to quantize the at least one block of pixels.

6. The non-transitory computer-readable medium of claim 1, wherein the instruction that, when executed, cause filtering the number of borders of the at least one block of pixels, cause applying a deblocking filter.

7. The non-transitory computer-readable medium of claim 1, wherein the instruction that, when executed, cause filtering the number of borders of the at least one block of pixels, cause applying a sample adaptive offset filter.

8. A device comprising:
    one or more processors; and
    memory storing instruction that, when executed by the one or more processors, cause the device to:
    receive a video;
    determine a content complexity of at least one block of pixels of a frame of the video based on a variation of the pixels;
    determine, based on the content complexity and a display pixel density of the video, a number of borders of the at least one block of pixels;
    filter, based on the content complexity, the number of borders of the at least one block of pixels; and
    cause output of the filtered at least one block of pixels.

9. The device of claim 8, wherein the content complexity comprises a feature associated with the at least one block of pixels.

10. The device of claim 8, wherein the instructions, when executed by the one or more processors, further cause the device to determine a number of features associated with the at least one block of pixels, and wherein the content complexity is based at least in part on the determined number of features.

11. The device of claim 8, wherein the determining the number of borders of the at least one block of pixels is further based at least in part on a pixel dimension of a sinusoidal grating cycle on display of the video.

12. The device of claim 8, wherein the determining the number of borders of the at least one block of pixels is further based at least in part on a quantization parameter used to quantize the at least one block of pixels.

13. The device of claim 8, wherein the instruction that, when executed by the one or more processors, cause the device to filter the number of borders of the at least one block of pixels, cause the device to apply a deblocking filter.

14. The device of claim 8, wherein the instruction that, when executed by the one or more processors, cause the device to filter the number of borders of the at least one block of pixels, cause the device to apply a sample adaptive offset filter.

15. A non-transitory computer-readable medium storing instructions that, when executed, cause:
    receiving a video;
    determining a content complexity of at least one block of pixels of a frame of the video based on a variation of the pixels;
    determining, based on the content complexity and a display pixel density of the video, a deblocking filter strength;
    filtering, based on the deblocking filter strength, the at least one block of pixels; and
    causing output of the filtered at least one block of pixels.

16. The non-transitory computer-readable medium of claim 15, wherein the instructions, when executed, further cause determining a number of features associated with the at least one block of pixels, and wherein the content complexity is based at least in part on the determined number of features.

17. The non-transitory computer-readable medium of claim 15, wherein the instructions that, when executed, cause filtering the at least one block of pixels, cause applying a deblocking filter.

18. The non-transitory computer-readable medium of claim 15, wherein the instructions that, when executed, cause filtering the at least one block of pixels, cause applying a sample adaptive offset filter.

19. A device comprising:
    one or more processors; and
    memory storing instructions that, when executed by the one or more processors, cause the device to:
    receive a video;
    determine a content complexity of at least one block of pixels of a frame of the video based on a variation of the pixels;
    determine, based on the content complexity and a display pixel density of the video, a deblocking filter strength;
    filter, based on the deblocking filter strength, the at least one block of pixels; and
    cause output of the filtered at least one block of pixels.

20. The device of claim 19, wherein the instructions, when executed by the one or more processors, further cause the device to determine a number of features associated with the at least one block of pixels, and wherein the content complexity is based at least in part on the determined number of features.

21. The device of claim 19, wherein the instructions that, when executed by the one or more processors, cause the device to filter the at least one block of pixels, cause the device to apply a deblocking filter.

22. The device of claim 19, wherein the instructions that, when executed by the one or more processors, cause the device to filter the at least one block of pixels, cause the device to apply a sample adaptive offset filter.

* * * * *